United States Patent [19]
Wirz

[11] 3,964,625
[45] June 22, 1976

[54] APPARATUS PROVIDED AT A VEHICLE FOR TILTING AND LOADING AND UNLOADING A RECEPTACLE BY A ROLLING ACTION

[75] Inventor: Herbert A. Wirz, Uetikon am See, Switzerland

[73] Assignee: Ernst Wirz AG, Kipper- & Maschinenfabrik, Uetikon am See, Switzerland

[22] Filed: Jan. 6, 1975

[21] Appl. No.: 538,434

[30] Foreign Application Priority Data
Jan. 15, 1974 Switzerland............................ 511/74

[52] U.S. Cl.................................. 214/502; 214/505; 214/515; 214/77 R
[51] Int. Cl.² ........................................... B60P 1/28
[58] Field of Search ........... 214/505, 501, 515, 502, 214/77 R; 298/11

[56] References Cited
UNITED STATES PATENTS

| | | | |
|---|---|---|---|
| 2,027,421 | 1/1936 | Eisenberg, Jr. | 214/502 |
| 2,963,185 | 12/1960 | Jones et al. | 298/11 X |
| 3,825,137 | 7/1974 | Mackrill et al. | 214/515 |
| 3,874,537 | 4/1975 | Kou | 214/515 |

*Primary Examiner*—Albert J. Makay

[57] ABSTRACT

An apparatus for a vehicle, especially a truck, incorporating at least one hydraulic lift mechanism for tilting a receptacle, typically a container, and for loading and unloading the receptacle by a rolling action by means of a pivotal hook arm which can be extended and retracted. A hydraulic auxiliary lift mechanism acts upon the hook arm and the receptacle through the agency of a pivotal auxiliary support both at the start of the tilting movement as well as also at the start of the unloading movement and assists both the start of the tilting movement and also the start of the unloading movement.

4 Claims, 8 Drawing Figures

APPARATUS PROVIDED AT A VEHICLE FOR TILTING AND LOADING AND UNLOADING A RECEPTACLE BY A ROLLING ACTION

BACKGROUND OF THE INVENTION

The present invention relates to a new and improved construction of apparatus provided for a vehicle, especially a truck, comprising at least one hydraulic lift mechanism for tilting a receptacle, typically a container, as well as for loading and unloading the receptacle by a rolling action through the agency of a pivotable hook arm which can be extended and retracted.

Such type devices have already become known to the art wherein the hydraulic lift mechanisms for tilting and rolling-off of the receptacle possess a very large field of action. This requires that the hydraulic lift mechanisms, both at the start of the tilting action as well as at the start of the loading of a receptacle, act with a relatively small lever arm upon the tiltable frames. The lift mechanisms must exert a large lift force in the presence of such small lever arm, and therefore must be correspondingly robustly dimensioned in order to receive in the extreme positions a sufficiently great force for tilting and loading.

SUMMARY OF THE INVENTION

It is a primary object of the present invention to provide an improved apparatus for a vehicle, especially a truck, for the tilting and loading and unloading of a receptacle of the like by a rolling action, and which apparatus is not encumbered with the aforementioned drawbacks and limitations of the prior art constructions.

A further and more specific object of this invention aims at reducing the forces required of such apparatuses for the tilting and the loading-on and the loading-off of a receptacle or the like.

Now in order to implement these and still further objects of the invention which will become more readily apparent as the description proceeds, it is contemplated according to the invention that with such apparatus a hydraulic auxiliary lift mechanism acts through the agency of a pivotable auxiliary support both at the start of the tilting movement as well as at the start of the unloading movement upon the hook arm and the receptacle and assists both the start of the tilting movement as well as also the start of the unloading movement. The auxiliary lift mechanism can operate with a very favorable lever arm, and therefore it is possible to reduce the maximum lift force required of the primary lift mechanism in the terminal positions, so that such lift mechanisms can be dimensioned to be smaller. Furthermore, the lever arm, by means of which the hydraulic primary lift mechanisms act at the start of the tilting and unloading movement, can be reduced, so that also the lever arm at the start of the loading movement is more favorable.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
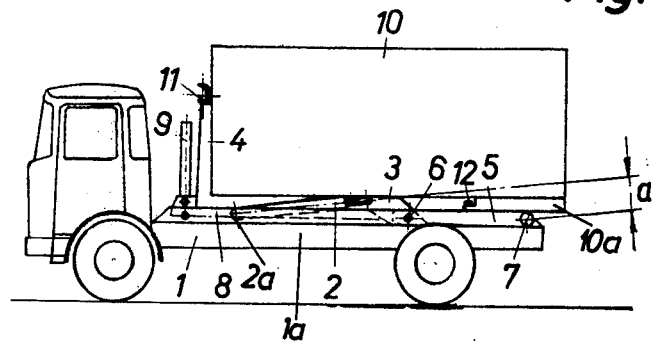
FIG. 1 is an elevational view of a vehicle, shown by way of example in the form of a truck with a tilting and roll-off apparatus for a receptacle, such as a container, the vehicle being shown in its travel position.

Describing now the drawings, the illustrated exemplary embodiment of vehicle 1, for instance a truck, possesses two standard hydraulic lift mechanisms 2 which are pivotably connected at one end 2a at the truck chassis 1a and at the other end 2b pivotably engage at a front tilting or tiltable frame 3 constructed as a substantially rectangular tube or pipe 3a. In this tilting or tiltable frame 3 there is guided an angle-shaped hooked or hook arm 4 having a hook portion 4a by means of a not particularly illustrated hydraulic lift mechanism, the hook arm being guided so as to be linearly extensible and retractable. The front tiltable frame 3 is hingedly connected with a rear tiltable frame 5 by a pivot shaft or axle 6 (FIG. 8) and the rear tiltable frame 5 in turn is tiltable about the pivot axle or shaft 7. Furthermore, at the pivot shaft or pin 6 or at another location of the tiltable frame 3 there is hingedly connected at one end 8a a substantially U-shaped constructed auxiliary carrier or support 8 which is hingedly connected at its other end 8b with a hydraulic auxiliary lift mechanism 9 which in turn is hingedly connected at location 9a with the truck chassis 1a.

Figure 2:
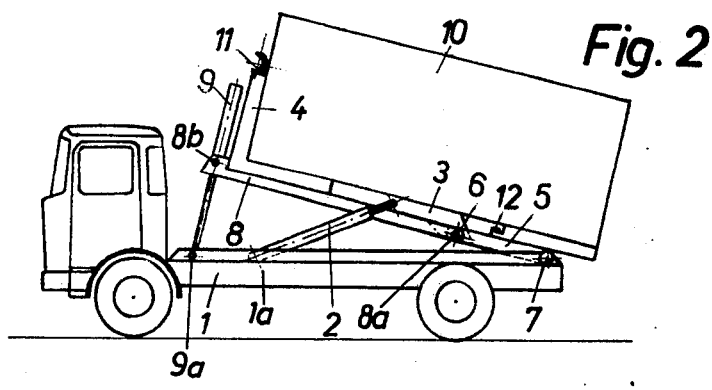
FIG. 2 is an elevational view, similar to the showing of FIG. 1, but with partially tilted receptacle.
Figure 3:
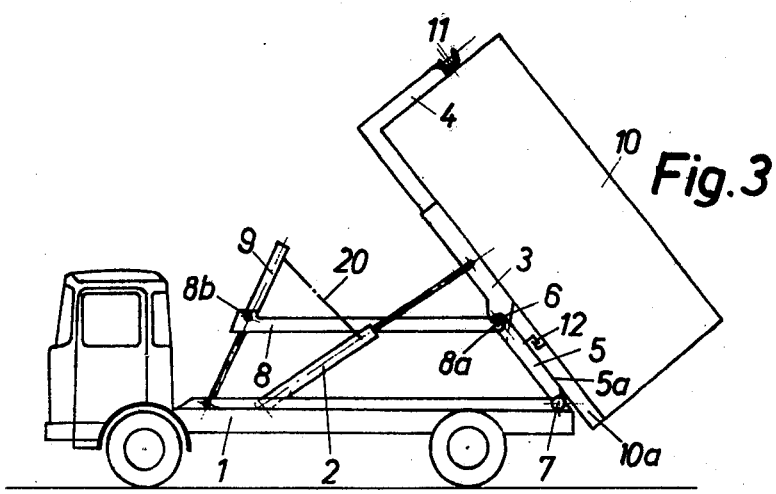
FIG. 3 illustrates an elevational view, similar to the showing of FIG. 1, but with the receptacle completely tilted.

A receptacle 10, for instance a container, is provided at its front end with a rod 11 or equivalent structure engaged by the hook 4a of the hook arm 4. At the bottom or lower region 10a of the container 10 and at the top or top region 5a of the rear tiltable frame 5 there are located suitable coacting locking elements 12 or equivalent structure which serve to securely lock the underside of the container 10 with the auxiliary frame 5 (FIGS. 1 to 3). The locking elements 12 could also be provided at the tiltable frame 3 instead of at the tiltable frame 5.

Figure 6:
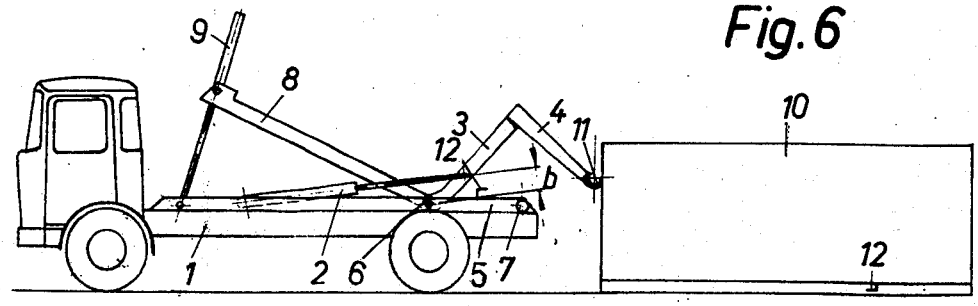
FIG. 6 is a similar elevational view with the container off-loaded.
Figure 7:
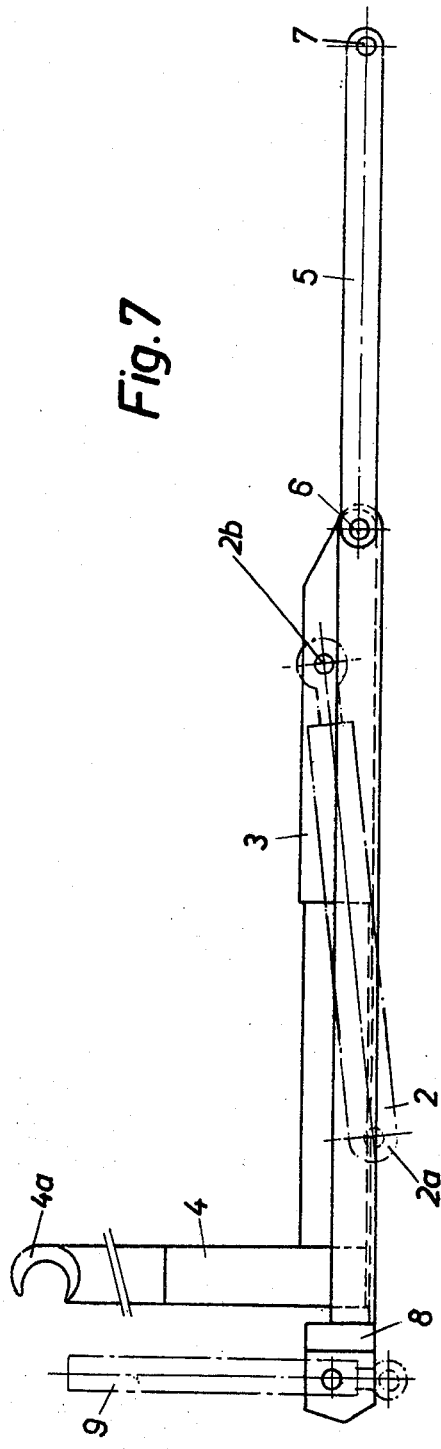
FIG. 7 is a side view on an enlarged scale of the tilting and roll-off mechanism.
Figure 8:
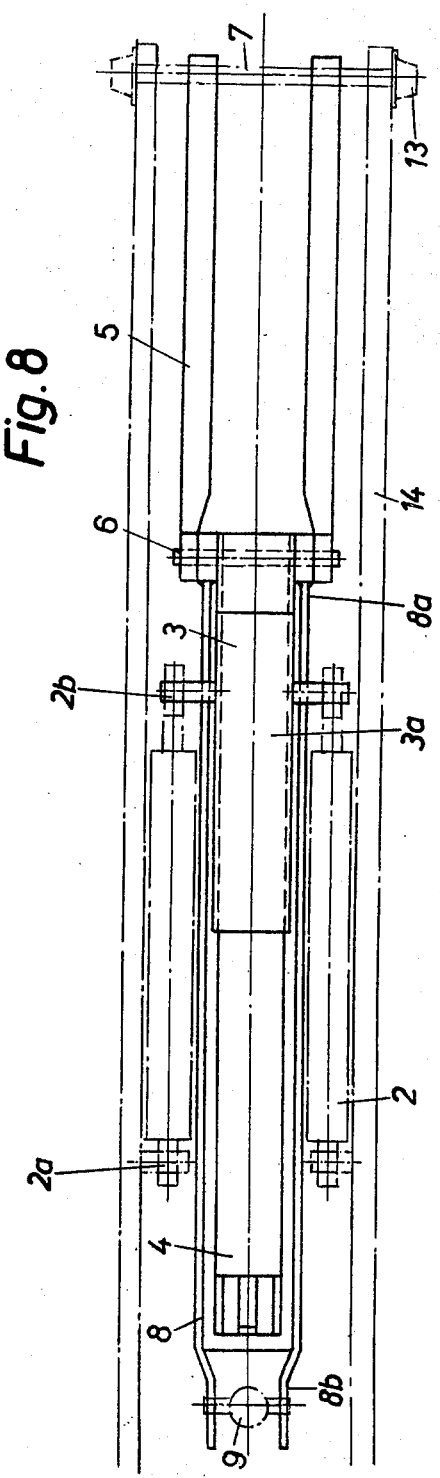
FIG. 8 is a top plan view of the arrangement of FIG. 7.

As best seen by referring to FIGS. 7 and 8, which illustrate in greater detail the components shown in FIGS. 1 to 6, rollers 13 or the like are mounted on the pivot shaft 7. On such rollers 13 there bears the container 10 and which container can roll upon such rollers 13 during the loading and unloading of such container. Furthermore, there is shown in phantom lines in FIG. 8 an auxiliary frame 14 which bears upon the truck or vehicle chassis.

If in the travel position of the vehicle shown in FIG. 1, the hydraulic lift mechanisms 2 and the hydraulic lift mechanism 9 simultaneously have delivered thereto a pressurized medium through the agency of conduits or lines connected with one another, and as schematically indicated by reference character 20 in FIG. 3 then the tiltable frames 3 and 5 which are coupled with one another and with the container 10 by means of the locking elements 12 rock out of the position shown in FIG. 1 into the position shown in FIG. 2 about the pivot shaft 7. At the start of this tilting movement the lift mechanisms 2 have an unfavorable lever arm $a$, whereas the auxiliary lift mechanism 9 has a more favorable lever arm and initially is primarily effective. It assists the lift mechanisms 2 for such length of time until such have a sufficiently great lever arm in order to complete the further tilting movement out of the position shown in FIG. 2 into the position shown in FIG. 3. During this movement the extended auxiliary lift mechanism 9 is held by the auxiliary support or carrier 8.

Figure 4:
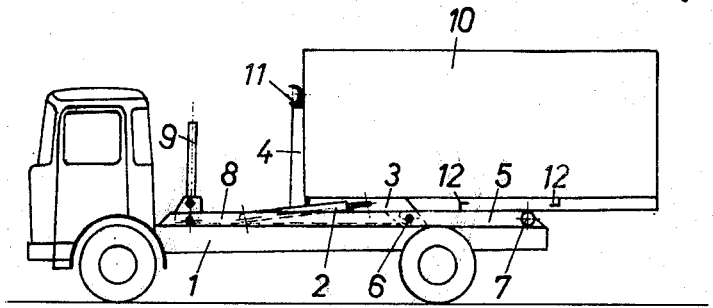
FIG. 4 is a similar elevational view with the receptacle shown in a push-backed position.
Figure 5:
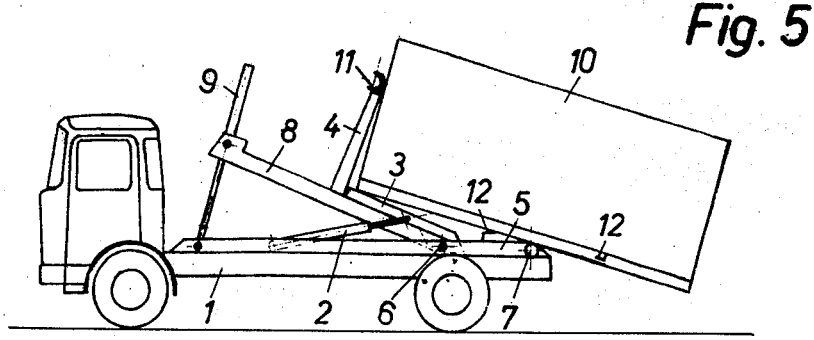
FIG. 5 is a similar elevational view during the rolling-off of the receptacle.

In order to off-load the container 10 such is initially shifted towards the rear out of the position portrayed in FIG. 1 into the position shown in FIG. 4 by retracting the hook arm 4 into the tiltable frame 3, and wherein as will be readily recognized, the locking elements 12 are brought out of engagement with one another. Now if the position of FIG. 4 the hydraulic lift mechanisms 2 and the hydraulic auxiliary lift mechanism 9 again have delivered thereto the pressurized medium, then the front tiltable frame 3 together with the hook arm 4 is rocked about pivot shaft 6, and at the start of this pivoting movement the lift mechanisms 2 are again assisted by the auxiliary lift mechanism 9. The force transmission from the auxiliary lift mechanism 9 to the front tiltable frame 3 occurs through the agency of the auxiliary support 8 which serves as the support for the frame 3 and hook arm 4. At the end of the stroke of the auxiliary lift mechanism 9 (FIG. 5) the pivotal movement of the hook arm 4 is solely terminated by the hydraulic lift mechanisms 2, and the container 10 rolls-off the truck chassis 1a via the rollers 13 and is loaded onto the ground (FIG. 6).

The on-loading or loading of the container 10 occurs in the reverse sequence, and at the start of the movement the lift mechanisms have an unfavorable lever arm $b$, as best seen by referring to FIG. 6. By means of the auxiliary lift mechanism 9 it is possible to reduce the lever arm $a$ up to approximately null. Consequently, the lever arm $b$ can be correspondingly increased in order to reduce the maximum required lift force of the lift mechanisms for the loading operation.

In this way it is possible to considerably smaller dimension the lift mechanisms 2 as was previously required. Calculations have shown that, for instance, for the tilting movement there is required about 40% less pressurized medium, e.g. pressurized oil, and thus the movement times are appreciably shortened. Further, it is mentioned that the hydraulic auxiliary lift mechanism and the auxiliary support are arranged and dimensioned such that with maximum tilting angle they enclose an obtuse angle.

While there is shown and described present preferred embodiments of the invention, it is to be distinctly understood that the invention is not limited thereto but may be otherwise variously embodied and practiced within the scopy of the following claims. Accordingly,

What is claimed is:

1. An apparatus for a vehicle, especially a truck, for tilting a container and for loading and unloading the container by a rolling action, comprising at least one hydraulic lift mechanism pivotably connected at one end to the truck chassis, a tiltable front frame pivotably connected to the other end of said lift mechanism, an extensible and retractable hook arm guided in said tiltable frame, means on the front end of said container for engaging a hook on said hook arm, a rear tiltable frame pivotably connected to the front frame by means of a pivot axle and to said chassis by a pivot axle, locking elements for locking said rear frame with said container, rollers on said last named pivot axle for rolling the container during loading and unloading; an auxiliary support hingedly connected at one end to said front frame, and a hydraulic auxiliary lift mechanism hingedly connected to the other end of said support, said auxiliary lift mechanism acting via said auxiliary support both at the start of the tilting movement and also at the start of the unloading movement upon the hook arm and the container and assisting both the start of the tilting movement as well as also the start of the unloading movement.

2. An apparatus according to claim 1, having a further hydraulic lift mechanism which with the first said hydraulic lift mechanism pivotably engages said front tiltable frame in such a manner that the lever arms of these mechanisms relative to said pivot axles at the beginning of the tilting and unloading movements equals approximately null.

3. An apparatus according to claim 1, whereby the bearing location of the auxiliary support coincides with the axis of rotation between the front tiltable frame and the rear tiltable frame.

4. An apparatus according to claim 1 wherein the hydraulic auxiliary lift mechanism is connected by conduit means with the hydraulic lift mechanism for tilting.

* * * * *